(12) United States Patent
Yamamoto

(10) Patent No.: US 11,173,870 B2
(45) Date of Patent: Nov. 16, 2021

(54) VEHICLE SEAT BELT DEVICE

(71) Applicant: Toyota Jidosha Kabushiki Kaisha, Toyota (JP)

(72) Inventor: Kazuhito Yamamoto, Toyota (JP)

(73) Assignee: TOYOTA JIDOSHA KABUSHIKI KAISHA, Toyota (JP)

(*) Notice: Subject to any disclaimer, the term of this patent is extended or adjusted under 35 U.S.C. 154(b) by 85 days.

(21) Appl. No.: 16/665,411

(22) Filed: Oct. 28, 2019

(65) Prior Publication Data

US 2020/0130640 A1 Apr. 30, 2020

(30) Foreign Application Priority Data

Oct. 30, 2018 (JP) .............................. JP2018-204104

(51) Int. Cl.
| | |
|---|---|
| *B60R 22/28* | (2006.01) |
| *B60R 22/26* | (2006.01) |
| *B60R 22/195* | (2006.01) |
| *B60R 22/18* | (2006.01) |

(52) U.S. Cl.
CPC ............ *B60R 22/28* (2013.01); *B60R 22/195* (2013.01); *B60R 22/26* (2013.01); *B60R 2022/1806* (2013.01); *B60R 2022/281* (2013.01)

(58) Field of Classification Search
CPC ....... B60R 22/26; B60R 22/28; B60R 22/195; B60R 22/1952; B60R 2022/281; B60R 2022/1806; B60R 2022/286
See application file for complete search history.

(56) References Cited

U.S. PATENT DOCUMENTS

| | | | |
|---|---|---|---|
| 7,147,251 B2 * | 12/2006 | Bell | B60R 22/022 |
| | | | 280/806 |
| 2005/0269148 A1 | 12/2005 | Koide et al. | |
| 2019/0106081 A1 * | 4/2019 | Hayashi | B60R 22/1951 |
| 2019/0344746 A1 * | 11/2019 | Moeker | B60R 22/28 |

FOREIGN PATENT DOCUMENTS

| | | | | |
|---|---|---|---|---|
| DE | 20219384 U1 * | 3/2003 | ......... | B60R 22/1951 |
| JP | 2004-161037 A | 6/2004 | | |
| JP | 2005-193846 A | 7/2005 | | |
| JP | 2005-349858 A | 12/2005 | | |
| JP | 2010-052534 A | 3/2010 | | |
| WO | WO-2009012860 A2 * | 1/2009 | ......... | B60R 22/1952 |

* cited by examiner

*Primary Examiner* — Paul N Dickson
*Assistant Examiner* — Scott F. Underwood
(74) *Attorney, Agent, or Firm* — Dinsmore & Shohl LLP

(57) ABSTRACT

A vehicle seat belt device that includes: a load transmitting member that is formed in a flexible elongate shape, an end portion, at a seat rear side, of the load transmitting member being engaged with an anchor that is secured, at a seat rear side and at a seat lower side of a seat cushion, to a vehicle body or a vehicle seat, and an end portion, at a seat front side, of the load transmitting member being engaged with a pretensioner that is provided at the seat front side and at the seat lower side of the seat cushion and which, upon activation, pulls the seat front-side end portion of the load transmitting member inside the pretensioner; and a guide portion that is provided integrally with a buckle and that abuts a middle portion of the load transmitting member.

5 Claims, 8 Drawing Sheets

VEHICLE SEAT BELT DEVICE

CROSS-REFERENCE TO RELATED APPLICATION

This application is based on and claims priority under 35 USC 119 from Japanese Patent Application No. 2018-204104 filed on Oct. 30, 2018, the disclosure of which is incorporated by reference herein.

BACKGROUND

Technical Field

The present disclosure relates to a vehicle seat belt device.

Related Art

Japanese Patent Application Laid-open (JP-A) No. 2005-193846 discloses a technology relating to an occupant restraint device. In the occupant restraint device, a tongue plate attached to a three-point seat belt that restrains an occupant seated in a vehicle seat is engaged with a buckle, and the buckle is rotatable in the vehicle up and down direction about an anchor via a coupling member. Furthermore, the buckle is provided with a pull-down mechanism that causes the buckle to rotate in the seat downward direction about the anchor at the time of an impact to the vehicle or when an impact to the vehicle is predicted. Consequently, at the time of an impact to the vehicle or when an impact to the vehicle is predicted, a lap belt that restrains the waist of the occupant via the buckle and the tongue plate is displaced in the seat downward direction about the anchor, thereby making it less likely for the lap belt to come free from the waist.

Furthermore, JP-A No. 2005-349858 discloses an art relating to a buckle pretensioner device. The buckle pretensioner device is provided with a substantially L-shaped rail member that allows the buckle to rotate in the seat downward direction and at the same time move in the seat rearward direction, and when there is a sudden deceleration of the vehicle, the buckle rotates in the seat downward direction and moves in the seat rearward direction because of the guidance of the rail member. Consequently, the lap belt that restrains the waist of the occupant via the buckle and the tongue plate is pulled in the occupant restraining direction, so the occurrence of submarining, in which the occupant slides in the seat forward direction under the lap belt when there is a sudden deceleration of the vehicle, can be inhibited.

In order to effectively inhibit submarining of the occupant in various postures, including a relaxed state in which the seat back is reclined, at the time of an impact to the vehicle in which the occupant seated in the vehicle seat moves in the seat forward direction (hereinafter called a "forward motion impact"), it is desirable to pull the lap belt to a great extent in substantially the seat downward direction at the time of a forward motion impact. This makes it less likely for the waist (pelvis) of the occupant to come free from the lap belt. However, the vehicle seat belt devices disclosed in JP-A No. 2005-193846 and JP-A No. 2005-349858 both have configurations that allow the buckle to rotate in the seat downward direction about the anchor or the rail member, so in order to pull the lap belt to a great extent in the seat downward direction, the flexural rigidity of the buckle and anchor coupling member and the rail member needs to be increased to efficiently transmit the activation force during rotation to the buckle. Because of this, there is the potential for the device to increase in size and weight. Consequently, the related art described above has room for improvement in this respect.

SUMMARY

A vehicle seat belt device of an aspect includes: a vehicle seat that has a seat cushion at which an occupant can be seated; a webbing that has a lap belt that restrains a waist part or thigh parts of the occupant in a case in which the occupant is seated in the vehicle seat; a buckle that is positioned on a side of the seat cushion and with which a tongue plate, which is attached to a boundary between the lap belt and another portion of the webbing, engages; a load transmitting member that is formed in a flexible elongate shape, an end portion, at a seat rear side, of the load transmitting member being engaged with an anchor that is secured, at a seat rear side and at a seat lower side of the seat cushion, to the vehicle body or the vehicle seat, and an end portion, at a seat front side, of the load transmitting member being engaged with a pretensioner that is provided at a seat front side and at the seat lower side of the seat cushion and which, upon activation, pulls the seat front-side end portion of the load transmitting member inside the pretensioner; and a guide portion that is provided integrally with the buckle, that is formed so as to arch toward an upper side of the seat as seen in a seat lateral view, and that abuts a middle portion of the load transmitting member.

DETAILED DESCRIPTION

An embodiment of a vehicle seat belt device pertaining to the present disclosure will be described below using FIG. 1 to FIG. 8. Arrow FR appropriately shown in these drawings indicates a seat forward direction, arrow UP indicates a seat upward direction, and arrow OUT indicates an outward direction in a seat width direction. Furthermore, in this embodiment, the seat forward direction, the outward direction in the seat width direction, and the seat upward direction substantially coincide with the vehicle forward direction, the outward direction in the vehicle width direction, and the vehicle upward direction, respectively.

Figure 1:
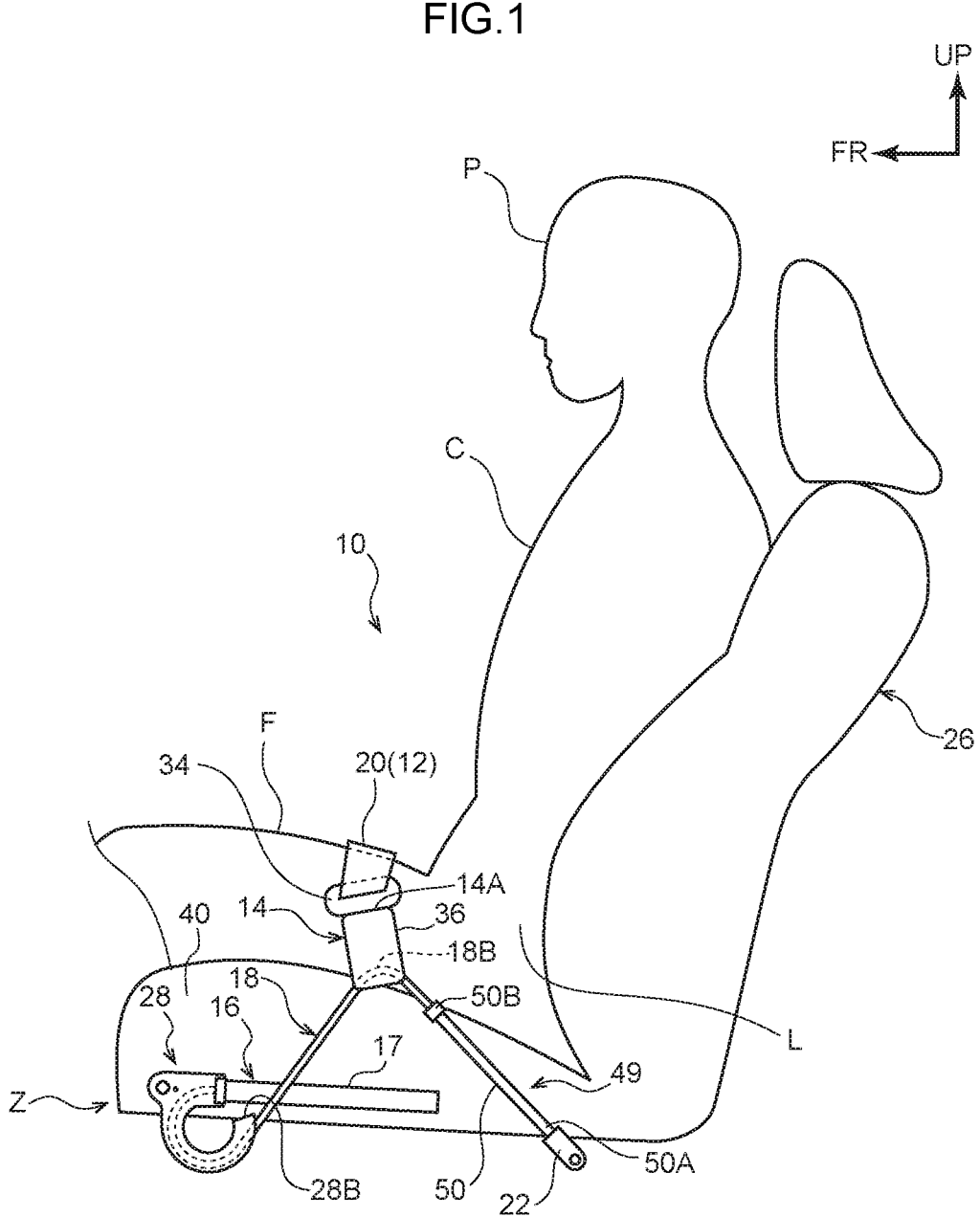
FIG. 1 is a schematic side view showing a normal state of a vehicle seat belt device pertaining to an embodiment.

In FIG. 1, a vehicle seat belt device 10 pertaining to the embodiment has a webbing 12, a buckle 14, a pretensioner 16, a load transmitting member 18, an anchor 22, and a vehicle seat 26.

The webbing 12 is a non-extensible band-like member for restraining an occupant P seated in the vehicle seat 26. The webbing 12 has a lap belt 20 that restrains a waist L side of thighs F of the occupant P and a shoulder belt that restrains a chest C of the occupant P in a state in which the occupant P is wearing the webbing 12. A tongue plate 34 is attached to the webbing 12. When the occupant P is wearing the webbing 12, the shoulder belt and the lap belt 20 are demarcated from each other by the tongue plate 34 as a boundary.

The buckle 14 is disposed on the seat width direction outer side (seat side) of a seat cushion 40 of the vehicle seat 26 on which the occupant P sits, and the buckle 14 has a structure with which the tongue plate 34 attached to the webbing 12 engages. When putting on the webbing 12, the tongue plate 34 is inserted into and engages with the buckle 14. Furthermore, when taking off the webbing 12, the tongue plate 34 can be disengaged by a release button on the buckle 14.

Figure 2:
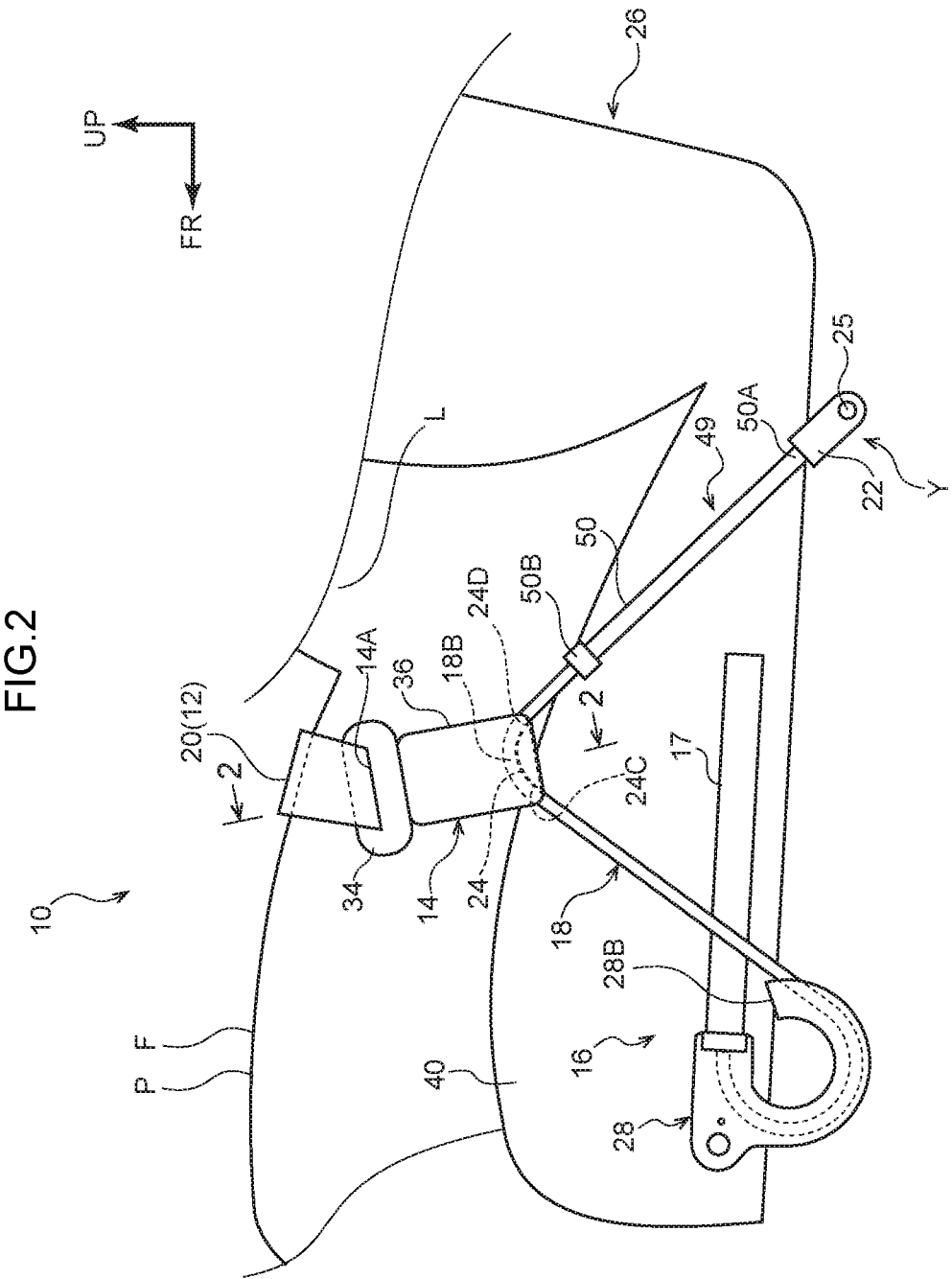
FIG. 2 is a schematic side view showing an enlargement of area Z of FIG. 1.
Figure 4:
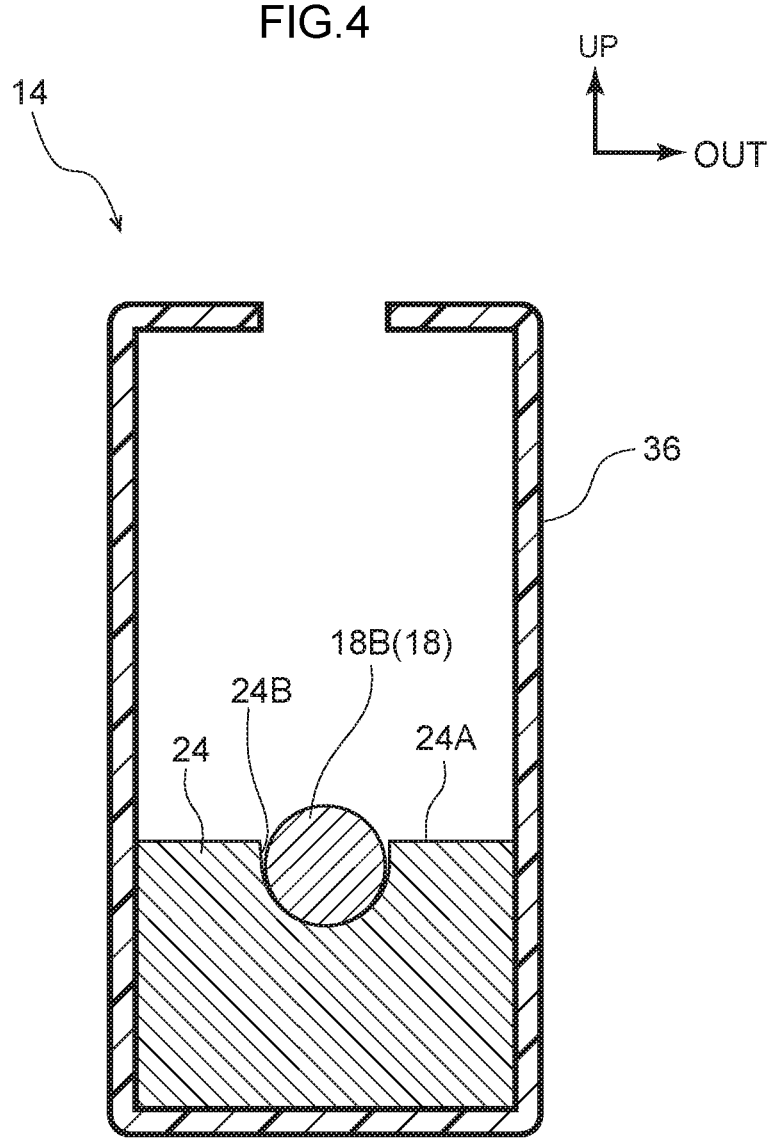
FIG. 4 is an enlarged sectional view showing a buckle cut along line 2-2 of FIG. 2.

The buckle 14 is covered by a resin cover 36, for example. A guide portion 24 is provided inside the resin cover 36. As shown in FIG. 2, the guide portion 24 is formed in such a way that its seat front and rear direction substantially center portion arches in the seat upward direction as seen in a vehicle side view. As shown in FIG. 4, the guide portion 24 has an upper surface 24A in which is formed a guide groove 24B that is recessed in the seat downward direction. The guide portion 24 is configured in such a way that the load transmitting member 18 fits inside the guide groove 24B. Furthermore, the guide portion 24 is disposed on the vehicle lower side in the resin cover 36, and, as shown in FIG. 2, through holes are formed in the resin cover 36 in positions corresponding to a vehicle front-side end portion 24C and a vehicle rear-side end portion 24D of the guide portion 24. The load transmitting member 18 is inserted into the resin cover 36 through the through holes in the resin cover 36 and is brought into abutment with, and is slidable in, the guide groove 24B in the guide portion 24.

The pretensioner 16 is a device for pulling in the buckle 14 upon activation. The pretensioner 16 is provided on a seat frame of the vehicle seat 26. Specifically, the pretensioner 16 has a pretensioner body portion 17 and a pull guide member 28, and the pretensioner body portion 17 is formed in the shape of an open cylinder. The pretensioner body portion 17 is disposed on the vehicle lower side of the seat cushion 40 and in such a way that the longitudinal direction of the pretensioner body portion 17 coincides with the seat front and rear direction. A movable part is provided inside the pretensioner body portion 17. The seat front-side end portion of the load transmitting member 18, which is flexible, is engaged with the movable part, whereby the movable part and the buckle 14 are coupled to each other.

The load transmitting member 18 is a member that is formed in a flexible elongate shape, is configured to a higher flexural rigidity than the webbing 12, bridges the buckle 14 and the pretensioner 16 and the anchor 22, and becomes pulled into the inside of the pretensioner body portion 17 when the pretensioner 16 is activated. Specifically, the load transmitting member 18 is a wire, for example, and its seat front-side end portion is engaged with the movable part from the seat front side of the pretensioner body portion 17. Furthermore, a seat rear-side end portion 18A of the load transmitting member 18 is engaged with the anchor 22 via a shock absorbing mechanism 49 described later. In a normal use state of the vehicle seat belt device 10 pertaining to the embodiment, the load transmitting member 18 is formed arching in the seat upward direction as seen in a vehicle side view in such a way that a longitudinal direction middle portion thereof (hereinafter simply called a "middle portion 18B") corresponding to the buckle 14 and located between the pull guide member 28 and an energy absorbing pipe 50 causes an upper end portion 14A of the buckle 14 to be positioned on the seat upper seat of the seat cushion 40. This allows for easier insertion of the tongue plate 34 into the buckle 14 when the occupant P seated in the vehicle seat 26 puts on the webbing 12 (seat belt). Furthermore, because the flexural rigidity of the load transmitting member 18 is configured to be higher than the flexural rigidity of the webbing 12, the initial state of the buckle 14 (an upright state in which the upper end portion 14A of the buckle 14 is pointed in substantially the seat upward direction) is maintained.

The pretensioner 16 receives operating current from a control unit at the time of an impact to the vehicle, is thereby activated, and generates a high-pressure gas inside the pretensioner body portion 17. The movable part is moved in the seat rearward direction by the pressure of the gas, whereby the load transmitting member 18 is pulled in the seat rearward direction from the seat front side.

Figure 3:
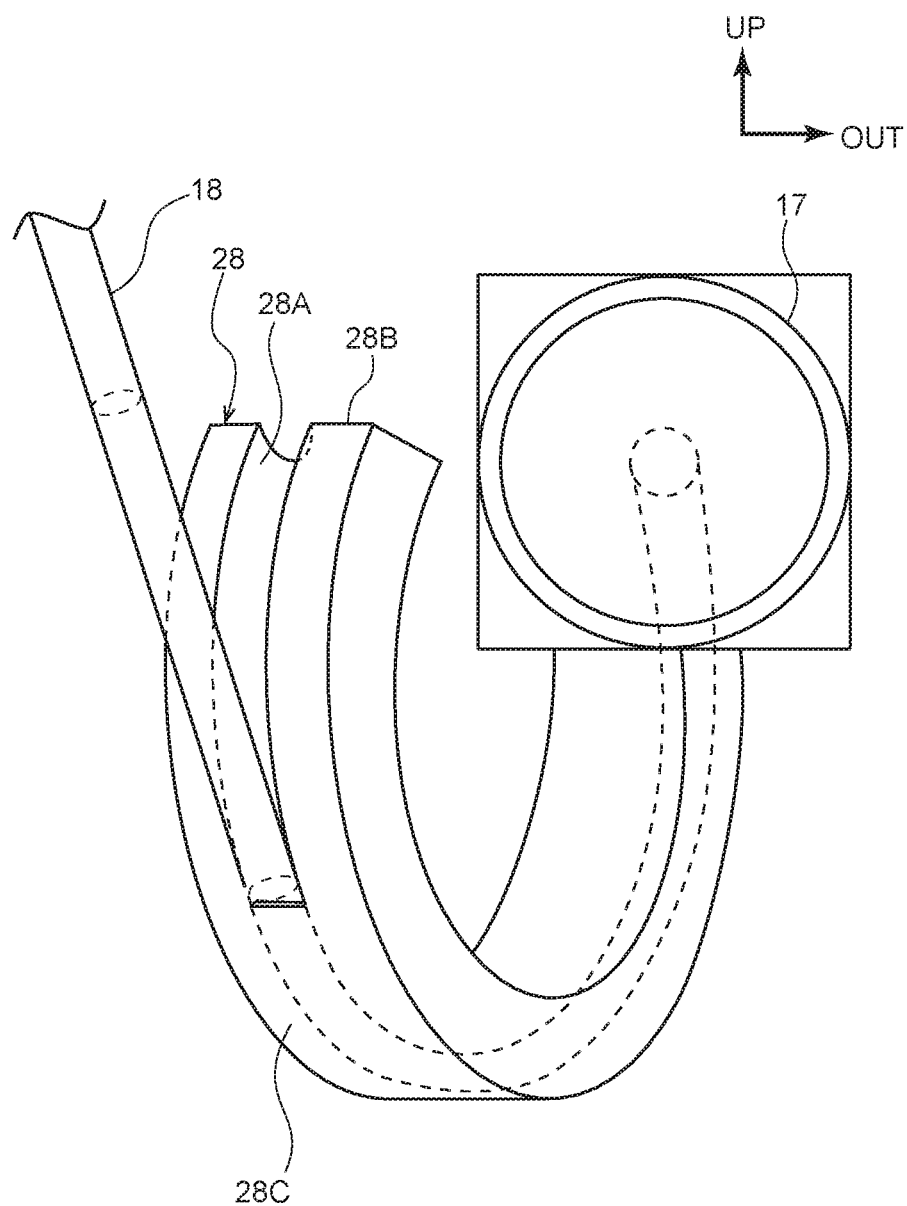
FIG. 3 is a schematic view showing a pretensioner of the vehicle seat belt device pertaining to the embodiment as seen from the seat rear side.

The vehicle front-side portion of the pretensioner 16 is configured by the pull guide member 28. The pull guide member 28 is bonded to the vehicle front-side end portion of the pretensioner body portion 17, has a groove portion 28A (see FIG. 3) formed inside, and is formed in the shape of a circular arc that projects in the seat downward direction from the pretensioner body portion 17 as seen in a vehicle side view. Specifically, the pull guide member 28 is formed in the shape of a circular arc which, as it heads in the vehicle forward direction from the vehicle front-side end portion of the pretensioner body portion 17, extends in the vehicle downward direction and the vehicle rearward direction. The pull guide member 28 has an end portion 28B on the opposite side of the pretensioner body portion 17, and the groove portion 28A at this end portion 28B opens in the vehicle upward direction and the vehicle forward direction. The load transmitting member 18 is inserted through, and is slidable in, the groove portion 28A. As shown in FIG. 3, the pull guide member 28 is formed in the shape of a helix heading outward in the seat width direction so that the load transmitting member 18 does not coincide with the pretensioner body portion 17 and therefore the pretensioner 16 as seen in a seat front view. Furthermore, part of a side wall 28C on the seat rear side at the end portion 28B of the pull guide member 28 is cut out in correspondence to the groove portion 28A. Because of this, the load transmitting member 18 extends smoothly in the seat rearward direction from the pull guide member 28.

Figure 7:
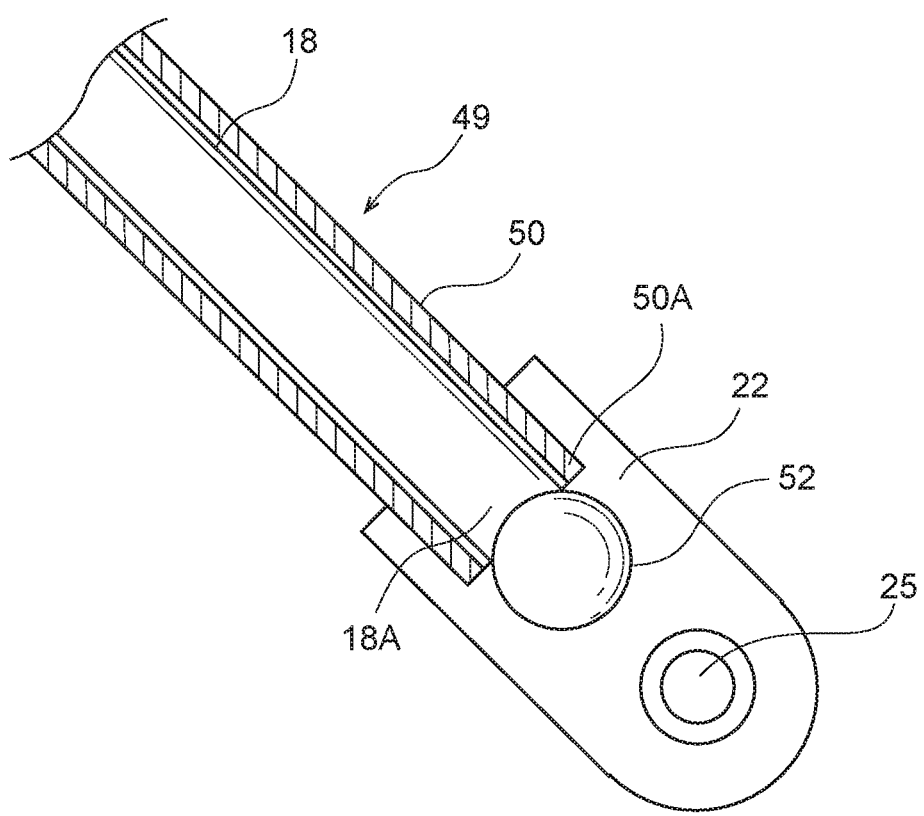
FIG. 7 is an enlarged sectional view showing area Y of FIG. 2 cut in the vehicle up and down direction.

As shown in FIG. 7, the anchor 22 is provided on the seat rear side and the seat lower side of the buckle 14 (see FIG. 2) and is rotatably secured to the seat frame. That is, the anchor 22 is formed substantially in the shape of a rectangle whose longitudinal direction coincides with a direction heading in the seat upward direction as it heads in the seat forward direction as seen in a vehicle side view, and the anchor 22 is rotatable about a fastener 25 that is inserted through the seat rear-side end portion of the anchor 22 and fastens the anchor 22 to the seat frame. Although the anchor 22 is secured to the seat frame, the anchor 22 is not limited to this and may also be secured to the vehicle body.

Provided on the seat front-side end portion of the anchor 22 is an energy absorbing pipe 50 serving as a shock absorbing member that configures part of a shock absorbing mechanism 49. The energy absorbing pipe 50 is formed in the shape of an open cylinder whose axial direction coincides with a direction heading in the seat upward direction as it heads in the seat forward direction as seen in a vehicle side view, and an axial direction rear-side end portion 50A of the energy absorbing pipe 50 is bonded to the anchor 22. The axial direction length of the energy absorbing pipe 50 is set to a length where an axial direction front-side end portion 50B of the energy absorbing pipe 50 is positioned in substantially the seat front and rear direction center of the seat cushion 40 of the vehicle seat 26 as seen in a vehicle side view (see FIG. 2).

Figure 8:
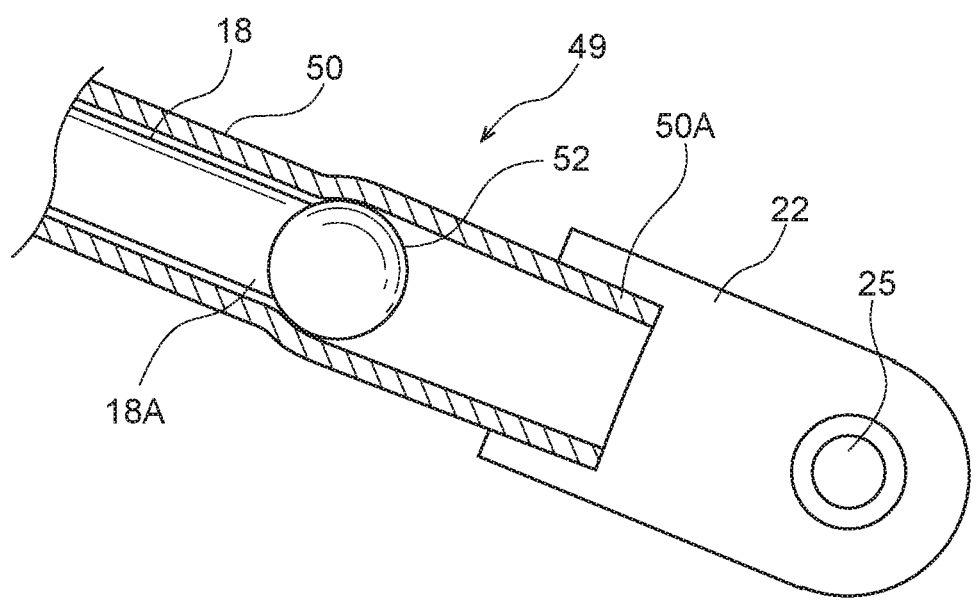
FIG. 8 is an enlarged sectional view showing area X of FIG. 6 cut in the vehicle up and down direction.

The load transmitting member 18 is inserted through the inside of the energy absorbing pipe 50. A ball member 52 serving as a catch member that configures another part of the shock absorbing mechanism 49 is attached to the seat rear-side end portion 18A of the load transmitting member 18 inserted through the inside of the energy absorbing pipe 50. The ball member 52 is formed in a spherical shape and its diameter is set larger than the inner diameter of the open cylinder of the energy absorbing pipe 50. Consequently, the ball member 52 is positioned on the seat rear side of the end portion 50A of the energy absorbing pipe 50 and functions as a retainer for retaining the load transmitting member 18 with respect to the energy absorbing pipe 50. The ball member 52 is configured so that when a load in substantially the seat forward direction equal to or greater than a predetermined load is input to the load transmitting member 18, the ball member 52 can move inside the energy absorbing pipe 50 along the longitudinal direction of the energy absorbing pipe 50 while expanding the energy absorbing pipe 50 in the radial direction of the energy absorbing pipe 50 as shown in FIG. 8.

Because of the above configuration, as shown in FIG. 2, the load transmitting member 18 is sequentially inserted, from the end portion 50A of the energy absorbing pipe 50, through the insides of the energy absorbing pipe 50, the guide portion 24 of the buckle 14, the pull guide member 28, and the pretensioner body portion 17 of the pretensioner 16.

On the seat side of the vehicle seat 26 on the opposite side of the seat side provided with the buckle 14, the longitudinal direction terminal of the lap belt 20 is engaged with an anchor that is secured to the seat frame via a shock absorbing mechanism 49 having the same configuration as the one described above. In other words, the shock absorbing mechanism 49 is provided as a right and left pair on the vehicle seat 26.

(Operation)

Figure 5:
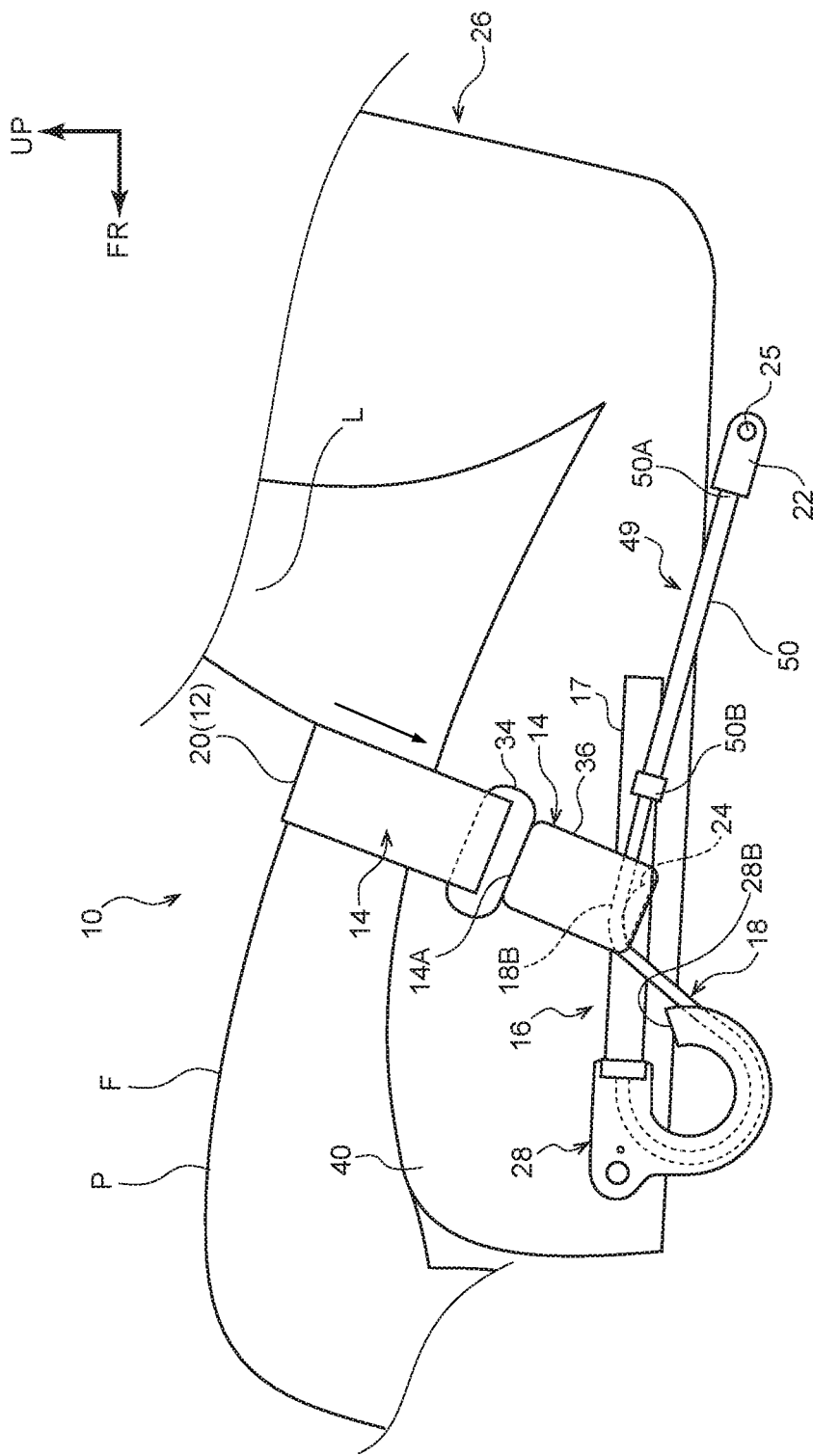
FIG. 5 is a schematic side view showing the vehicle seat belt device pertaining to the embodiment during an initial stage of impact.

When a forward motion impact occurs in a state in which the occupant P is wearing the webbing 12, the pretensioner 16 is activated. Specifically, when the pretensioner 16 is activated, high-pressure gas is generated inside the pretensioner body portion 17, the movable part is moved in the seat rearward direction by the pressure of the gas, and the front end portion of the load transmitting member 18 is pulled in the seat rearward direction. Because of this, as shown in FIG. 5, during the initial stage of impact, the middle portion 18B of the load transmitting member 18 becomes displaced in the seat downward direction and the seat forward direction, so the operating load (tensile load) of the pretensioner 16 acts on the buckle 14 through which the middle portion 18B of the load transmitting member 18 is inserted. Because of this operating load, the lap belt 20 is pulled in the seat downward direction and the seat forward direction, as indicated by the arrow in FIG. 5, via the buckle 14 and the tongue plate 34 that is engaged therewith. Because of this, the waist L side of the thighs F of the occupant P is pulled against the seat cushion 40. Consequently, even in a state in which the waist L (pelvis) of the occupant P was inclined in the seat rearward direction as a result of the occupant P assuming a relaxed posture, the waist L becomes less likely to slide under the lap belt 20 because the waist L comes upright (tilts forward).

Figure 6:
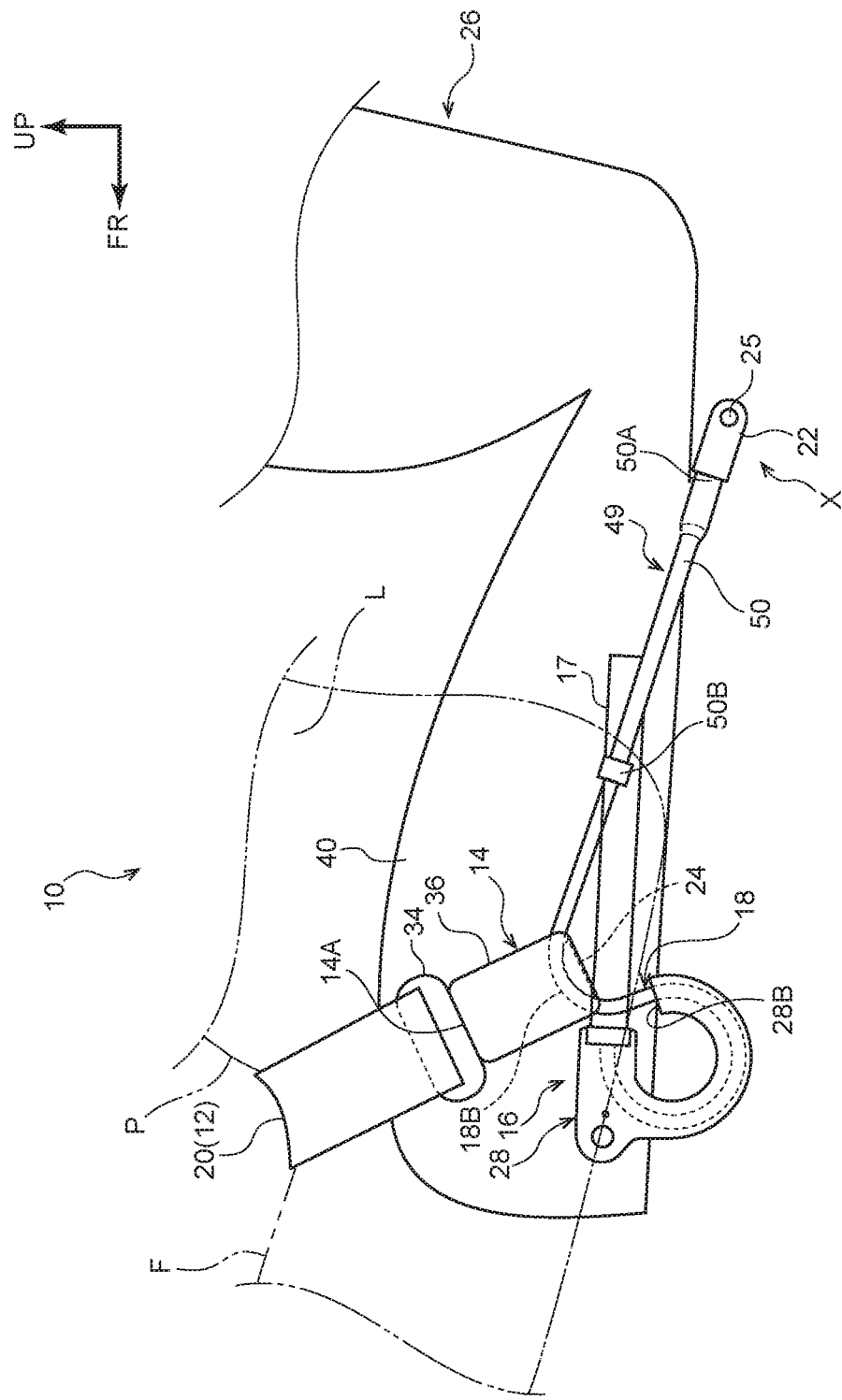
FIG. 6 is a schematic side view showing the vehicle seat belt device pertaining to the embodiment during a later stage of impact.

Next, as shown in FIG. 6, when the occupant P moves in the seat forward direction as a result of receiving the impact load resulting from the frontal impact to the vehicle, a tensile load in substantially the seat forward direction acts on the middle portion 18B of the load transmitting member 18 via the lap belt 20 and the buckle 14. In a case where this tensile load is equal to or greater than the predetermined load, as shown in FIG. 8, the ball member 52 at the end portion 18A of the load transmitting member 18 moves inside the energy absorbing pipe 50 while expanding the energy absorbing pipe 50 in its radial direction. In other words, the tensile load acting on the load transmitting member 18 is partially absorbed by the deformation of the energy absorbing pipe 50 by the ball member 52, which reduces the load that the occupant P moving in the seat forward direction receives from the lap belt 20.

Meanwhile, the front end portion of the load transmitting member 18 is pulled in the seat rearward direction by the operation of the pretensioner 16, and at this time the load transmitting member 18 is pulled along the groove portion 28A in the pull guide member 28. In other words, when the pretensioner 16 is activated, the seat downward-direction component of the tensile load always acts on the middle portion 18B of the load transmitting member 18 that is positioned on the seat rear side of the portion of the load transmitting member 18 that is inserted through the groove portion 28A. For this reason, during the later stage of impact also, restraint of the waist L by the lap belt 20 of the webbing 12 corresponding to the waist L of the occupant P is ensured. For this reason, the occurrence of submarining, in which the waist L slides in the seat forward direction under the lap belt 20 can be inhibited.

Action and Effects of Embodiment

Next, the action and effects of the embodiment will be described.

In the embodiment, as shown in FIG. 2, the buckle 14 is provided between the anchor 22 and the pretensioner 16, and the load transmitting member 18 arches in the seat upward direction in such a way that the middle portion 18B corresponding to the buckle 14 is positioned on the seat upper side of the seat front-side end portion and the seat rear-side end portion 18A of the load transmitting member 18 as seen in a seat side view. Consequently, when the pretensioner 16 is activated and the seat front-side end portion of the load transmitting member 18 is pulled into the inside of the pretensioner 16, the buckle 14 is pulled in substantially the seat downward direction by the middle portion 18B moving in substantially the seat downward direction. At this time, because the middle portion 18B of the load transmitting member 18 is in abutment with the guide portion 24 that arches in the seat upward direction in the buckle 14, the buckle 14 can be smoothly pulled in substantially the seat downward direction. For this reason, the lap belt 20 is directly pulled in substantially the seat downward direction via the tongue plate 34 that is engaged with the buckle 14, so even in a case where the waist L (pelvis) of the occupant P is tilted backward as a result of the occupant P assuming a relaxed posture, the pelvis tilts forward at the lap belt 20 and the waist L becomes less likely to come free from the lap belt 20. Because of this, the buckle 14 can be directly pulled by the load transmitting member 18 that is flexible and extends in the seat front and rear direction, so the device overall can be made compact. Because of this, the occurrence of submarining can be inhibited at the time of a forward motion impact including also the occupant P in a relaxed state, and weight reduction and mountability can be enhanced.

Furthermore, as shown in FIG. 4, the buckle 14 and the guide portion 24 are integrally configured, so compared to a case where they are separately configured, the buckle 14 and the guide portion 24 can be brought into close proximity with each other in substantially the seat up and down direction. Because of this, when the guide portion 24 is pulled in substantially the seat downward direction by the load transmitting member 18, the buckle 14 can be pulled further in substantially the seat downward direction. Furthermore, the number of parts can also be reduced.

Moreover, as shown in FIG. 5, when the pretensioner 16 is activated and the seat front-side end portion of the load transmitting member 18 is pulled into the pretensioner body portion 17, the load transmitting member 18 is pulled along the pull guide member 28, so the middle portion 18B of the load transmitting member 18, and therefore the buckle 14, moves to a greater extent in substantially the seat downward direction. Furthermore, as shown in FIG. 6, also in a case where the buckle 14 has moved in the seat forward direction in accompaniment with the inertial movement of the occupant P in the seat forward direction at the time of a forward motion impact, the buckle 14 can continue to be pulled in the seat downward direction. Because of this, occupant restraint performance at the time of a forward motion impact can be enhanced even more.

Moreover, the anchor 22 is rotatable about an axis along the seat width direction and is provided with the shock absorbing mechanism 49. The shock absorbing mechanism 49 is formed in the shape of an open cylinder, and the portion of the load transmitting member 18 on the seat rear side of the middle portion 18B is inserted inside the shock absorbing mechanism 49. Consequently, the shock absorbing mechanism 49 can rotate about the anchor 22 in accompaniment with the displacement of the load transmitting member 18 in substantially the seat up and down direction by the activation of the pretensioner 16. In other words, the shock absorbing mechanism 49 does not require new space for installation because it is provided along part of the load transmitting member 18. Furthermore, the shock absorbing mechanism 49 absorbs a load of a predetermined value or greater in the seat forward direction acting on the load transmitting member 18. Consequently, the shock absorbing mechanism 49 can be made to act as a force limiter mechanism that absorbs some of the kinetic energy by which the occupant P inertially moves in the seat forward direction at the time of a forward motion impact. Because of this, occupant protection performance at the time of a forward motion impact can be enhanced.

Furthermore, the shock absorbing mechanism 49 has the energy absorbing pipe 50 and the ball member 52 as shown in FIG. 7. The energy absorbing pipe 50 is formed in the shape of an open cylinder, the seat rear-side end portion 50A of the energy absorbing pipe 50 is attached to the anchor 22, and the portion of the load transmitting member 18 on the seat rear side of the middle portion 18B is inserted through the inside of the energy absorbing pipe 50. The ball member 52 is attached to the seat rear-side end portion 18A of the load transmitting member 18 and is positioned on the seat rear side of the seat rear-side end portion 50A of the energy absorbing pipe 50, and the ball member 52 is set larger than the inner diameter of the energy absorbing pipe 50. Additionally, as shown in FIG. 8, in a case where a load of a predetermined value or greater has been input in substantially the seat forward direction to the load transmitting member 18, that is, in a case where the occupant P inertially moves in the seat forward direction at the time of a forward motion impact, the ball member 52 moves inside the energy absorbing pipe 50 while expanding the energy absorbing pipe 50 in the radial direction of the energy absorbing pipe 50. In other words, some of the kinetic energy by which the occupant P inertially moves can be absorbed by the deformation of the energy absorbing pipe 50 by the ball member 52. Consequently, a force limiter mechanism can be configured by a simple configuration. Because of this, occupant protection performance at the time of a forward motion impact can be enhanced at a low cost.

Moreover, as shown in FIG. 6, in the pull guide member 28 of the pretensioner 16, the groove portion 28A at the end portion 28B on the opposite side of the pretensioner body portion 17 opens in the vehicle upward direction and the vehicle forward direction. Consequently, the load transmitting member 18 can be pulled along the pull guide member 28 also in a case where the middle portion 18B has moved in the seat forward direction when the occupant P has inertially moved in the seat forward direction at the time of a forward motion impact. In other words, it becomes difficult for a break to occur in the load transmitting member 18, so pulling can be performed smoothly while preventing local concentration of stress in the load transmitting member 18.

Furthermore, in the pull guide member 28, because the groove portion 28A at the end portion 28B on the opposite side of the pretensioner body portion 17 opens in the vehicle upward direction and the vehicle forward direction, it becomes easier for the buckle 14 to be pulled in the seat downward direction and the seat rearward direction when the occupant P has inertially moved in the seat forward direction at the time of a forward motion impact. Consequently inertial movement of the occupant P in the seat forward direction can be inhibited so that submarining can be inhibited even more.

In the embodiment described above, the seat forward direction of the vehicle seat 26 substantially coincides with the vehicle forward direction, but the vehicle seat 26 is not limited to this and may also be configured in such a way that the seat forward direction faces a direction other than the vehicle forward direction in a self-driving car, for example. In this case, "at the time of a forward motion impact" means at the time of a type of impact other than a frontal impact to the vehicle, namely, at the time of a type of impact in which the occupant P seated in the vehicle seat 26 moves in the seat forward direction at the time of the impact (as an example, a rear-end collision in a case where the seat forward direction of the vehicle seat 26 substantially coincides with the vehicle rearward direction).

Furthermore, the shock absorbing mechanism 49 has a configuration where the ball member 52 attached to the end portion 18A of the load transmitting member 18 moves inside the energy absorbing pipe 50 secured to the anchor 22 while deforming the energy absorbing pipe 50. However, the shock absorbing mechanism 49 may also have a configuration where the energy absorbing pipe 50 is attached to the end portion 18A of the load transmitting member 18, the ball member 52 is secured to the anchor 22, and, in a case where a load of a predetermined value or greater has acted on the load transmitting member 18, the energy absorbing pipe 50 moves while being deformed by the ball member 52. The shock absorbing mechanism 49 may also have a configuration other than this. Moreover, the shock absorbing mechanism 49 is configured to include the energy absorbing pipe 50 and the ball member 52, but the shock absorbing mechanism 49 is not limited to this and may also be configured by a closed cylinder-shaped damper member, or may also be configured by another member that can absorb a tensile load in substantially the seat forward direction acting on the load transmitting member 18.

Moreover, the load transmitting member 18 inserted through the inside of the guide portion 24 is brought into abutment with, and is slidable in, the guide groove 24B in the guide portion 24. In other words, the load transmitting member 18 is relatively movable with respect to the guide portion 24 and therefore the buckle 14, but the load transmitting member 18 is not limited to this and may also have a configuration where the middle portion 18B of the load transmitting member 18 and the guide portion 24 are bonded to each other so that the load transmitting member 18 does not relatively move with respect to the guide portion 24.

An embodiment of the disclosure has been described above, but the disclosure is not limited to what is described above and can be modified and implemented in various ways, in addition to what is described above, in a range that does not depart from the spirit thereof.

An object of the present disclosure is to obtain a vehicle seat belt device that can inhibit the occurrence of submarining at the time of a forward motion impact including also an occupant in a relaxed state and can enhance weight reduction and mountability.

A vehicle seat belt device of a first aspect includes: a vehicle seat that has a seat cushion at which an occupant can be seated; a webbing that has a lap belt that restrains a waist part or thigh parts of the occupant in a case in which the occupant is seated in the vehicle seat; a buckle that is positioned on a side of the seat cushion and with which a tongue plate, which is attached to a boundary between the lap belt and another portion of the webbing, engages; a load transmitting member that is formed in a flexible elongate shape, an end portion, at a seat rear side, of the load transmitting member being engaged with an anchor that is secured, at a seat rear side and at a seat lower side of the seat cushion, to the vehicle body or the vehicle seat, and an end portion, at a seat front side, of the load transmitting member being engaged with a pretensioner that is provided at a seat front side and at the seat lower side of the seat cushion and which, upon activation, pulls the seat front-side end portion of the load transmitting member inside the pretensioner; and a guide portion that is provided integrally with the buckle, that is formed so as to arch toward an upper side of the seat as seen in a seat lateral view, and that abuts a middle portion of the load transmitting member.

According to the first aspect, the vehicle seat belt device has the webbing, the buckle, the load transmitting member, and the guide portion. The webbing has the lap belt that restrains the waist or the thighs of the occupant seated in the vehicle seat that has the seat cushion on which the occupant can sit. The tongue plate is attached to the webbing at the boundary between the lap belt and the other portion of the webbing, and the tongue plate is engaged with the buckle that is positioned on the side of the seat cushion. The load transmitting member is formed in a flexible elongate shape, and the seat rear-side end portion of the load transmitting member is engaged with the anchor that is secured, on the seat rear side and the seat lower side of the seat cushion, to the vehicle body or the vehicle seat. The seat front-side end portion of the load transmitting member is engaged with the pretensioner that is provided on the seat front side and the seat lower side of the seat cushion. Upon activation, the pretensioner pulls the seat front-side end portion of the load transmitting member into the inside of the pretensioner. The guide portion is provided integrally with the buckle and is formed arching in the seat upward direction as seen in a seat side view. Furthermore, the longitudinal direction middle portion of the load transmitting member is in abutment with the inside of the guide portion. In other words, the buckle is provided between the anchor and the pretensioner, and the load transmitting member arches in the seat upward direction in such a way that the middle portion corresponding to the buckle is positioned on the seat upper side of the seat front-side end portion and the seat rear-side end portion as seen in a seat side view. Consequently, when the pretensioner is activated and the seat front-side end portion of the load transmitting member is pulled into the inside of the pretensioner, the buckle is pulled in substantially the seat downward direction by the middle portion moving in substantially the seat downward direction. At this time, because the middle portion of the load transmitting member is in abutment with the guide portion that arches in the seat upward direction in the buckle, the buckle can be smoothly pulled in substantially the seat downward direction. For this reason, the lap belt is directly pulled in substantially the seat downward direction via the tongue plate that is engaged with the buckle, so even in a case where the waist (pelvis) of the occupant is tilted backward, the pelvis tilts forward at the lap belt and the waist becomes less likely to come free from the lap belt. Because of this, the buckle can be directly pulled by the load transmitting member that is flexible and extends in the seat front and rear direction, so the device overall can be made compact.

A second aspect is the vehicle seat belt device of the first aspect, wherein the pretensioner includes: a pretensioner body portion that pulls the seat front side end portion of the load transmitting member into the pretensioner body portion; and a pull guide member that is attached to the pretensioner body portion and that slidably abuts a portion of the load transmitting member between the seat front side end portion and the middle portion of the load transmitting member, and wherein the pull guide member is formed in a shape of a circular arc that projects toward a lower side of the seat relative to the pretensioner body portion.

According to the second aspect, the pretensioner has the pretensioner body portion and the pull guide member. When the pretensioner is activated, the pretensioner body portion pulls the seat front-side end portion of the load transmitting member into it. The pull guide member is provided in a position in the neighborhood of the pretensioner body portion and corresponding to between the longitudinal direction seat front-side end portion and the middle portion of the load transmitting member. The pull guide member is formed in the shape of a circular arc that projects in the seat downward direction with respect to the pretensioner body portion, and the load transmitting member is in slidable abutment with the pull guide member. Consequently, when the pretensioner is activated and the seat front-side end portion of the load transmitting member is pulled into the pretensioner body portion, the load transmitting member is pulled along the pull guide member, so the middle portion of the load transmitting member, and therefore the buckle, moves to a greater extent in the seat downward direction. Furthermore, also in a case where the buckle has moved in the seat forward direction in accompaniment with the inertial movement of the occupant in the seat forward direction at the time of a forward motion impact, the buckle can continue to be pulled in the seat downward direction.

A third aspect is the vehicle seat belt device of the first or second aspect, wherein: the anchor is rotatable about an axis that is oriented along a seat width direction, and the anchor is provided with an open cylinder-shaped shock absorbing mechanism, through the inside of which a portion of the load transmitting member toward a seat rear side of the middle portion is inserted, and which absorbs a load that is at least a predetermined value and is acting on the load transmitting member toward a seat front side.

According to the third aspect, the anchor is rotatable about an axis along the seat width direction and is provided with the shock absorbing mechanism. The shock absorbing mechanism is formed in the shape of an open cylinder, and the portion of the load transmitting member on the seat rear side of the middle portion is inserted inside the shock absorbing mechanism. Consequently, the shock absorbing mechanism can rotate about the anchor in accompaniment with the displacement of the load transmitting member. In other words, the shock absorbing member does not require new space for installation because it is provided along part of the load transmitting member. Furthermore, the shock absorbing mechanism absorbs a load of a predetermined value or greater in the seat forward direction acting on the load transmitting member. Consequently, the shock absorbing mechanism can be made to act as a force limiter mechanism that absorbs some of the kinetic energy by which the occupant inertially moves in the seat forward direction at the time of a forward motion impact.

A fourth aspect of the vehicle seat belt device of the third aspect, wherein the shock absorbing mechanism includes: an open cylinder-shaped shock absorbing member having a seat rear side end portion that is attached to the anchor, the portion of the load transmitting member toward the seat rear side of the middle portion being inserted through the open cylinder-shaped shock absorbing member, and a catch member that is attached to the seat rear side end portion of the load transmitting member and is larger than an inner diameter of the shock absorbing member, and wherein, in a case in which a load that is at least a predetermined value is input to the load transmitting member toward substantially the seat front side, the catch member moves inside the shock absorbing member while expanding the shock absorbing member in a radial direction of the shock absorbing member.

According to the fourth aspect, the shock absorbing mechanism has the shock absorbing member and the catch member. The shock absorbing member is formed in the shape of an open cylinder, the seat rear-side end portion of the shock absorbing member is attached to the anchor, and the portion of the load transmitting member on the seat rear side of the middle portion is inserted through the inside of the shock absorbing member. The catch member is attached to the seat rear-side end portion of the load transmitting member and is positioned on the seat rear side of the seat rear-side end portion of the shock absorbing member, and the catch member is set larger than the inner diameter of the shock absorbing member. Additionally, in a case where a load of a predetermined value or greater has been input in substantially the seat forward direction to the load transmitting member, that is, in a case where the occupant inertially moves in the seat forward direction at the time of a forward motion impact, the catch member moves inside the shock absorbing member while expanding the shock absorbing member in the radial direction of the shock absorbing member. In other words, some of the kinetic energy by which the occupant inertially moves can be absorbed by the deformation of the shock absorbing member by the catch member. Consequently, a force limiter mechanism can be configured by means of a simple configuration.

The vehicle seat belt device of the first aspect can inhibit the occurrence of submarining at the time of a forward motion impact including also an occupant in a relaxed state and can enhance weight reduction and mountability.

The vehicle seat belt device of the second aspect can enhance occupant restraint performance at the time of a forward motion impact even more.

The vehicle seat belt device of the third aspect can enhance occupant protection performance at the time of a forward motion impact.

The vehicle seat belt device of the fourth aspect can enhance, at a low cost, occupant protection performance at the time of a forward motion impact.

What is claimed is:

1. A vehicle seat belt device, comprising:
    a vehicle seat that has a seat cushion at which an occupant can be seated;
    a webbing that has a lap belt that restrains a waist part or thigh parts of the occupant in a case in which the occupant is seated in the vehicle seat;
    a buckle that is positioned on a side of the seat cushion and with which a tongue plate, which is attached to a boundary between the lap belt and another portion of the webbing, engages;
    a load transmitting member that is formed in a flexible elongate shape, an end portion, at a seat rear side, of the load transmitting member being engaged with an anchor that is secured, at the seat rear side and at a seat lower side of the seat cushion, to a vehicle body or the vehicle seat, and an end portion, at a seat front side, of the load transmitting member being engaged with a pretensioner that is provided at the seat front side and at the seat lower side of the seat cushion and which, upon activation, pulls the seat front-side end portion of the load transmitting member inside the pretensioner, the pretensioner including:
        a pretensioner body portion that pulls the seat front side end portion of the load transmitting member into the pretensioner body portion, the pretensioner body portion formed in the shape of an open cylinder extending in a seat front-rear direction; and
        a pull guide member that is attached to the pretensioner body portion and that slidably abuts a portion of the load transmitting member between the seat front side end portion and the middle portion of the load transmitting member, the pull guide member formed in a shape of a circular arc that projects toward a lower side of the seat relative to the pretensioner body portion; and
    a guide portion that is provided integrally with the buckle, that is formed so as to arch toward an upper side of the seat as seen in a seat lateral view, and that abuts a middle portion of the load transmitting member.

2. The vehicle seat belt device according to claim 1, wherein:
    the anchor is rotatable about an axis that is oriented along a seat width direction, and
    the anchor is provided with an open cylinder-shaped shock absorbing mechanism, through the inside of which a portion of the load transmitting member toward a seat rear side of the middle portion is inserted, and which absorbs a load that is at least a predetermined value and is acting on the load transmitting member toward the seat front side.

3. The vehicle seat belt device according to claim 2, wherein the shock absorbing mechanism includes:

an open cylinder-shaped shock absorbing member having a seat rear side end portion that is attached to the anchor, the portion of the load transmitting member toward the seat rear side of the middle portion being inserted through the open cylinder-shaped shock absorbing member, and a catch member that is attached to the seat rear side end portion of the load transmitting member and is larger than an inner diameter of the shock absorbing member, and wherein, in a case in which a load that is at least a predetermined value is input to the load transmitting member toward substantially the seat front side, the catch member moves inside the shock absorbing member while expanding the shock absorbing member in a radial direction of the shock absorbing member.

4. The vehicle seat belt device according to claim 3, wherein:

the shock absorbing member is an energy absorbing pipe, and the catch member is a ball member.

5. The vehicle seat belt device according to claim 1, wherein the pull guide member has, at an end portion thereof at an opposite side from the pretensioner body portion, a groove portion that opens toward a vehicle upper side and a vehicle front side.

* * * * *